Nov. 24, 1964 L. J. WEISSERT 3,158,804
IGNITION TESTING SYSTEM FOR SELECTIVELY TESTING SPARK
PULSE, CONDENSER, COIL, R.P.M., AND
CIRCUIT CONTINUITY
Filed Aug. 17, 1959 2 Sheets-Sheet 1

INVENTOR.
LAURENCE J. WEISSERT
BY
ATTORNEYS

INVENTOR.
LAURENCE J. WEISSERT
BY
ATTORNEYS 3,158,804
IGNITION TESTING SYSTEM FOR SELECTIVELY
TESTING SPARK PULSE, CONDENSER, COIL,
R.P.M., AND CIRCUIT CONTINUITY
Laurence J. Weissert, Otsego, Mich., assignor to Kal-
Equip Company, Inc., Otsego, Mich., a corporation of
Michigan
Filed Aug. 17, 1959, Ser. No. 834,315
2 Claims. (Cl. 324—15)

This invention relates generally to testers for ignition systems of internal combustion engines and more particularly to novel means for testing the ignition system of a single cylinder engine of the type utilized to drive a lawn mower.

Heretofore, it has been impractical to test the ignition system of a single cylinder engine under operating conditions since ignition system testers of the prior art required that the test be applied at the distributor lead thereto so that it was necessary to by-pass the spark plug. Thus, prior art tests of single cylinder engines were usually limited to visual inspection and an interchange of known good parts for parts of the ignition system under test.

The ignition system tester of the instant invention overcomes this shortcoming by including means which will indicate the overall condition of the ignition system by merely moving the engine through a few cycles (approximately three) with a single pull of the starting cord. The tester of the instant invention includes a mode switch whereby the components of the tester are selectively arranged to indicate overall ignition performance, the speed of the engine, the conditions of the condenser and coil, and also provide a test of continuity.

Overall ignition performance is tested by disconnecting the high tension lead of the engine ignition system from the spark plug and connecting this lead to a suitable lead of the tester. An operator then pulls the engine through a cycle by means of the starting cord. If the ignition system is functioning the high voltage output therefrom is applied to the primary of a step-down transformer. The low voltage winding of the transformer is connected in parallel with a rectifier capacitor combination with the capacitor being charged through the action of the pulse appearing at the high voltage winding.

The rectifier prevents discharge of the condenser through the low voltage transformer winding. However, a meter connected in series with a high resistance is connected across the capacitor so that the capacitor discharges slowly through the meter. A sensitive meter is utilized with a high resistance and a large capacitor so that substantial time is required for the capacitor to discharge. Thus, even though the duration of the high voltage pulse is extremely short a readable indication appears upon the meter.

In the alternative, a peak reading voltmeter can be utilized. Another system for obtaining a readable indication from the short duration pulse comprises the utilization of a meter which is quick to rise and slow to return. This can be accomplished by utilizing an overruning clutch on the meter needle so that it is free to move up scale and on its return journey to zero indication a retarding frictional force is applied by the overrunning clutch.

The ignition energy for single cylinder engines is usually supplied by a magneto driven by the engine. Since the construction and placement of the magneto rotor and stator makes inspection thereof extremely difficult the engine testing procedure should be such that if the fault lies with any other component of the ignition system this should be readily determinable prior to the inspection of the magneto rotor and stator. In line with this requirement, if the overall ignition test results in a satisfactory indication the trouble does not lie with the magneto.

In addition the ignition system tester of the instant invention is constructed so that the tester indicator will selectively indicate the engine speed, the condition of the condenser, the condition of the engine ignition coil and the continuity of the ignition system. These tests are utilized when the overall ignition system test proves unsatisfactory. If each of the tests in the last group proves satisfactory then as a last resort the magneto rotor and stator can be taken down for inspection and repair.

Accordingly, it is a primary object of this invention to provide a novel tester for internal combustion engine ignition systems adapted especially for single cylinder engines.

Another object of this invention is to provide a novel ignition system tester constructed so that the overall performance of the engine ignition system can be tested without the necessity of running the engine.

Still another object of this invention is to provide a novel ignition system tester which will selectively indicate engine speed, the condition of the overall ignition system, the condition of the ignition condenser, the condition of the ignition coil, and the continuity of the ignition system.

These as well as other objects of the instant invention shall become more readily apparent after reading the following description of the exemplary embodiment thereof in which.

Figure 1:
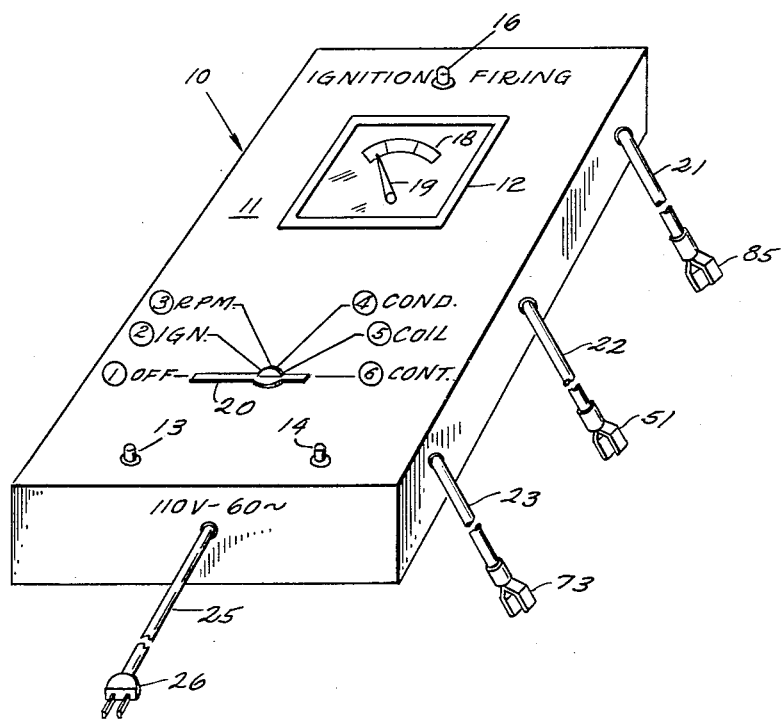
FIGURE 1 is a perspective of the exemplary ignition tester.
Figure 2:
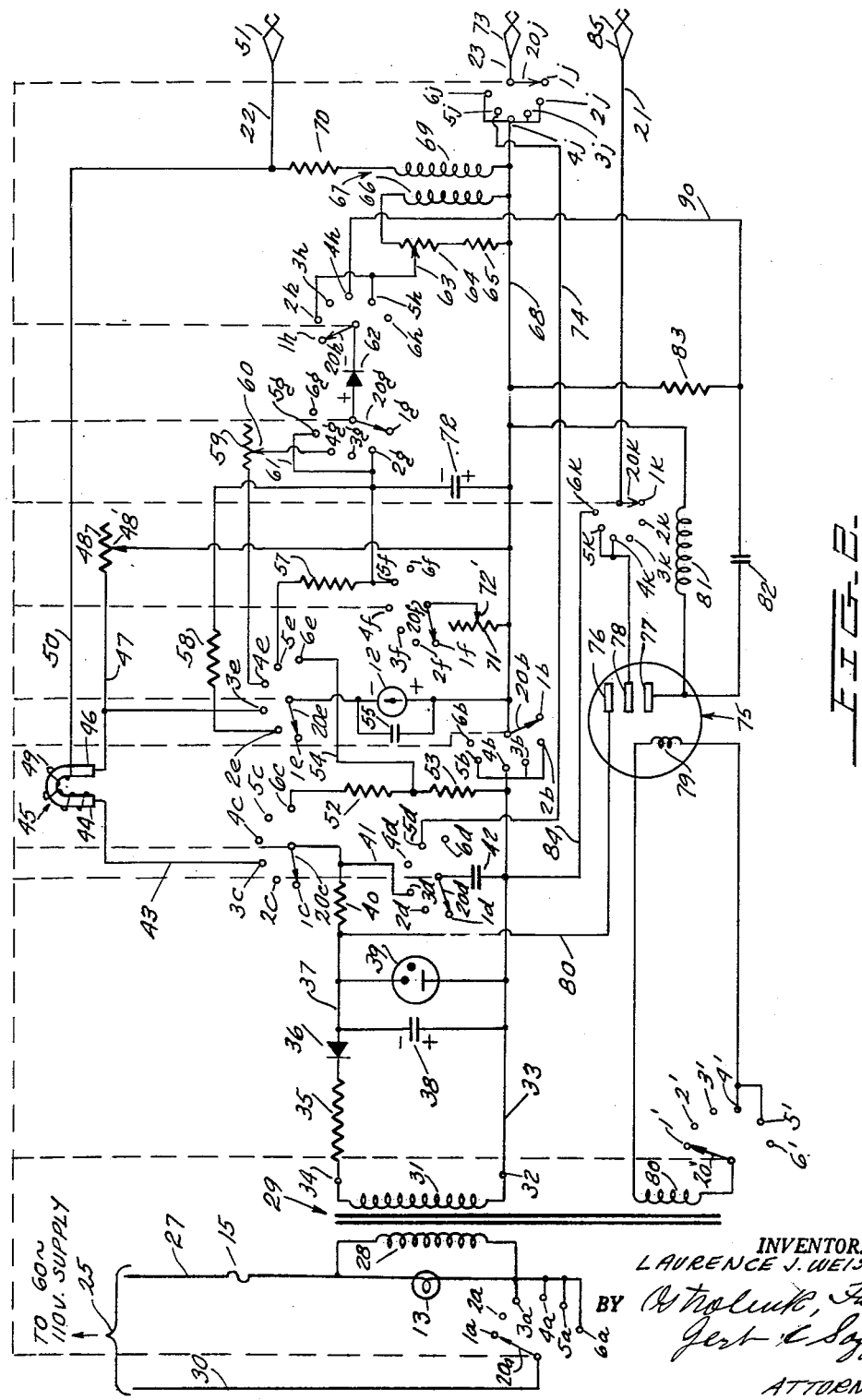
FIGURE 2 is a schematic circuit diagram of the exemplary ignition tester.

Now referring to the figures, the ignition system tester 10 is housed in a suitable case 11 with an indicator means comprising meter 12 exposed on the top face of case 11. Also exposed on the top face of case 11 are a pilot light 13, a fuse holder 14 wherein fuse 15 is disposed, and an ignition firing indicator in the form of thyratron 16. The operating handle for mode switch 20 is also mounted to the top face of case 11. Test leads 21, 22, grounding lead 23 and line cord 25 extend from tester 10 through suitable grommet means.

A conventional two prong plug 26 is connected to one end of line cord 25 and is adapted to be connected to a 110 volt 60 cycle power supply. Conductor 27 of line cord 25 is connected through fuse 15 to one terminal of primary winding 28 of power transformer 29 and other conductor 30 of line cord 25 is connected to switch arm 20a of mode switch 20. Mode switch 20 is a multidecked wafer switch in this case having eleven wafers. The terminals 3a–6a of mode switch 20, associated with switch arm 20a are each connected to the other terminal of primary winding 28. Pilot light 13 is connected in parallel with primary winding 28 on the load side of fuse 15 to visibly indicate when the primary 28 of transformer 29 is energized.

Terminal 32 of secondary winding 31 is connected to conductor 33 which forms portion of the circuit means for electrically interconnecting the elements of tester 10. The other terminal 34 of secondary winding 31 is connected through current limiting resistor 35, of approximately 1,000 ohms, to the negative terminal of semiconductor diode 36. The positive terminal of diode 36 is connected through circuit means conductor 37 to the negative terminal of filter capacitor 38 whose positive terminal is connected to circuit means conductor 33. Capacitor 38 is in the order of 16 mfd. Gas filled voltage regulator tube 39 is connected in parallel with filter capacitor 38 with the cathode thereof being connected to conductor 37 and the anode thereof being connected to conductor 33. The anode of voltage regulator tube 39 is also connected through conductor 33 to terminals 2b–5b of mode switch 20 and the cathode of voltage regulator tube 39 is connected through conductor 37 to one terminal of resistor 40, of approximately 5,600 ohms, whose other terminal is connected to switch arm 20c, connected through jumper 41 to mode switch terminal 3d. Capacitor 42, of approximately 0.5 mfd. is connected between circuit means conductor 33 and switch arm 20d.

Mode switch terminal 3c is connected through conductor 43 to cathode 44 of thyratron 45. The anode 46 of thyratron 45 is connected through circuit means conductor 47 to variable resistor 48 whose adjusting arm 48' is connected to circuit means conductor 68. Control element 49 of thyratron 45 is connected through circuit means conductor 50 to test lead 22 whose free end is supplied with a clip 51 adapted to be connected to the high tension lead of the ignition system (not shown) of the engine under test. Thyratron 45 is a xenon gas filled tube of the type commonly utilized for ignition testing.

Mode switch terminal 6c is connected through resistors 52, 53 to conductor 33 with the junction between resistors 52, 53 connected through circuit means conductor 54 to mode switch terminal 6e. The negative terminal of meter 12 is connected to switch arm 20e while the positive terminal of meter 12 is connected to switch arm 20b. Capacitor 55, of approximately 500 mfd., is connected in parallel with meter 12. Resistor 57, of approximately 5,600 ohms, is connected to mode switch terminals 5e and 5f. Resistor 58, of approximately 100,000 ohms, is connected between switch terminals 2e and 2g which are connected to switch terminal 5f.

Mode switch terminal 4e is connected to variable resistor 59 whose adjusting arm 60 is connected to mode switch terminal 4g. Terminals 2g and 5g are interconnected by jumper 61. Switch arm 20g is connected to the positive terminal of semi-conductor diode 62 whose negative terminal is connected to contact arm 20h. Contacts 2h and 5h are both connected to the movable arm 63 of resistor 64 which is connected in series with resistor 65 across the secondary 66 of step-down transformer 67. The junction between resistor 65 and secondary winding 66 is connected to circuit means conductor 68. One end of primary winding 69 is also connected to conductor 68 while the other end is connected to test lead 22 through resistor 70. Resistor 64 is preferably 1,200 ohms while resistors 65 and 70 are each preferably 1.5 megohms. The ratio of the primary to secondary turns of step-down transformer 67 is typically 7,000 to 120.

Circuit means conductor 68 extends between switch arm 20b and the common tie between mode switch contacts 2j–4j and 6j. One end of variable resistor 71 is connected to conductor 68 with the adjusting arm 72' thereof connected to switch arm 20f. Resistor 71 is in the order of 500 ohms. Condenser 72, in the order of 2 mfd., is connected between conductor 68 and the jumper which interconnects switch contacts 5f and 2g. Switch arm 20j is connected to ground test lead 23 whose free end is provided with clip 73. Circuit means conductor 74 extends between mode switch terminals 5j and 5d.

Vibrator means 75 comprises stationary contacts 76, 77 which are alternately engageable by movable contact 78 when contact 78 is caused to vibrate through the energization of coil 79. Coil 79 is energized through secondary winding 80 of transformer 29. When switch arm 20' engages either switch contacts 4' or 5', stationary contact 76 is connected through circuit means conductor 80 to the cathode of voltage regulator tube 39. Stationary contact 77 is connected to the junction between inductance 81 and capacitor 82 whose other ends are interconnected through resistor 83. The junction between resistor 83 and inductance 81 is connected to circuit means conductor 68. Resistor 83 is typically 22,000 ohms while capacitor 82 is preferably .05 mfd. and inductance 81 preferably comprises 35 turns of ¼ inch diameter. Movable contact 78 is connected to switch contacts 4k and 5k while switch contact 6k is connected through conductor 84 to the plate of voltage regulator tube 39. Switch arm 20k is connected to test lead 21 whose free end is provided with clip 85.

Having hereinbefore described the circuitry of ignition tester 10, the operation thereof will now be described. With mode switch 20 in position 1, or the "OFF" position, switch arm 20a engages contact 1a so that transformer 29 is not energized. At this time switch arm 20e is in engagement with contact 1e, switch arm 20b is in engagement with contact 1b, and switch arm 20j is in engagement with contact 1j so that there is no complete path from any of the test leads 21–23 through meter 12 and tester 10 is completely inactive.

The overall ignition performance of the engine under test is observed by disconnecting the high tension lead of the engine from the spark plug of the engine and connecting this high tension lead to clip 51. Clip 73 is connected to a grounded portion of the engine under test. Mode switch 20 is then operated to position 2, or the "IGN" position. In this position switch arm 20a is engaged with contact 2a so that transformer 29 is not energized.

Switch arm 20j is in engagement with contact 2j so that conductor 68 is connected to ground and by this means the positive terminal of meter 12 is also grounded. Switch arm 20e is in engagement with contact 2e so that the negative terminal of meter 12 is connected through resistor 58 to the negative terminal of capacitor 72. Switch arm 20g is in engagement with contact 2g so that the positive terminal of diode 62 is connected to the negative terminal of capacitor 72. The negative terminal of diode 62 is connected through switch arm 20h, engaged with contact 2h, to the adjusting arm 63 of resistor 64.

The engine starting cord is then operated to pull the engine through a cycle. If the ignition system is functioning the magnetos will produce a pulse appearing at test lead 22 which will energize the primary 69 of step-down transformer 67. This pulse will appear across secondary 66 and charge capacitor 72 to the polarity indicated.

The resistance in the charging circuit for capacitor 72 is extremely small so that charging will be very rapid. Diode 62 blocks discharge of condenser 72 through secondary winding 66 or resistors 64, 65. Thus, discharge of capacitor 72 occurs slowly through resistor 58, of relatively high resistance value, and meter 12. With this arrangement, a single short duration impulse in primary winding 69 will produce a readable indication on meter 12 for a reasonable long interval of time, say ½ second, so that reading of this indication is convenient. If a satisfactory reading is obtained on meter 12 and the spark plug does not fire this indicates that the fault lies with the spark plug.

In order to check the speed of the motor under test mode switch 20 is operated to position 3, or the "r.p.m." position. The high tension lead of the motor under test is remounted to the motor spark plug and clip 51 is also secured to the spark plug. Clip 73 remains secured to a grounded portion of the motor under test. Switch arm 20a is in engagement with contact 3a so that transformer 29 is energized. A D.C. voltage appears between circuit means conductors 33 and 37 with conductor 33 being positive with respect to conductor 37. Voltage regulator tube 39, as is well known to the art, will maintain the D.C. potential existing between conductors 33 and 37 substantially constant even though there are slight fluctuations in the input voltage to transformer 29 and even though there are slight variations in load current. Tube 39 is preferably of a type which will establish a 150 volt potential difference between conductors 33 and 37.

Switch arm 20c is in engagement with contact 3c thereby connecting cathode 44 of thyratron 45 to B— potential through resistor 40. Switch arm 20d is in engagement with contact 3d so that capacitor 42 is connected between conductor 33 and switch arm 20c and acts as a potential source for the tachometer circuit, which potential source would otherwise appear as being poorly regulated by virtue of resistor 40 connected between regulator tube 39 and condenser 42. The B+ potential existing at conductor 33 is grounded by virtue of the fact that switch arm 20b engages contact 3b and switch arm 20j engages contact 3j. Thus, the anode of thyratron 45 is connected through variable resistor 48 to B+.

The positive terminal of meter 12 is also connected to B+ while the negative terminal of meter 12 is connected through switch arm 20e, in engagement with contact 3e, to anode 46 of thyratron 45. Thus, meter 12 is connected so as to read the voltage appearing across the portion of resistor 48 between anode 46 and adjusting arm 48'.

With mode switch 20 in the r.p.m. position condenser 42 charges thru resistor 40 to 150 volts, or maximum supply voltage. If the thyratron 45 conducts or strikes, it will stay struck until condenser 42 is discharged or almost discharged. As the thyratron's resistance in its conductive state is very low and resistor 48, which is across the meter 12 also is low, the voltage of condenser 42 will drop to approximately zero because resistor 40 limits the charging current to condenser 42.

When the voltage across condenser 42 drops to zero thyratron 45 then becomes non-conductive and current ceases to flow through the meter circuit until thyratron 45 is again tripped or made conductive by a high tension pulse appearing at test lead 22 and produced at the spark plug. The 150 volts that appear across thyratron 45 are not enough to start ionization or conduction of it, a higher voltage, at least two or three thousand volts, which is derived from the engine ignition is required to restrike thyratron 45.

The number of conducting periods for thyratron 45 in a given time interval is a function of the number of high tension pulses appearing at thyratron control element 49. Thus, the higher the speed of the engine the higher will be the reading obtained on meter 12.

The condenser of the ignition system of the motor under test is tested by first stopping rotation of the motor. Appropriate portions of the engine and/or ignition system are removed so that the ungrounded terminal of the condenser to be tested is accessible and clip 85 is connected thereto. Mode switch 20 is operated to its position 4, or the "COND." position wherein contact arm 20a is in engagement with contact 4a so that transformer 29 is energized and, as previously explained, a regulated D.C. potential exists between conductors 33 and 37.

Contact arm 20' is in engagement with contact 4' so that vibrator coil 79 is energized. B+ together with the positive terminal of meter 12 are grounded since switch arm 20j is in engagement with contact 4j and switch arm 20b is in engagement with contact 4b. The negative terminal of meter 12 is connected through contact 20e in engagement with contact 4e through a portion of resistor 59, through contact 4g, through contact arm 20g, through diode 62, through switch arm 20h, contact 4h and circuit means conductor 90 to the junction between resistor 83 and capacitor 82.

Switch arm 20k is engaged with contact 4k so that the movable contact 78 of vibrator means 75 is connected to the condenser under test through test lead 21. The energization of vibrator coil 79 causes movable contact 78 to alternately engage one and then the other of stationary contacts 76 and 77. When contact 76 is engaged by contact 78 the condenser under test is connected to B— and during this interval of time the condenser under test is charged. Thereafter, movable contact 78 parts from stationary contact 76 and engages stationary contact 77. The condenser under test then discharges through meter 12 as well as the R.F. generating means comprised of inductor 81 and capacitor 82.

Thus, the condenser of the ignition system under test will alternately be connected through vibrator contact 76 to the regulated D.C. voltage supply and through vibrator contact 77 to a metering circuit. The discharge of the condenser under test induces a voltage in inductance 81. The reading of meter 12 is an indication of this induced voltage and will be lower when there is series resistance in the condenser since this resistance will interfere with the oscillations in inductance 81 thereby causing less voltage to be induced across inductance 81.

The coil of the ignition system is tested by removing clip 85 from the condenser terminal and connecting it to the ungrounded terminal of the coil under test. Mode switch 20 is operated to its 5th position, or "COIL" position. Transformer 29 remains energized through the engagement of switch arm 20a and contact 5a so that the regulated voltage appears between conductors 33 and 37.

The coil is connected through its lead 21 and the engagement between switch arm 20k and contact 5k to the movable contact of vibrator means 75. The engagement between switch arm 20' and contact 5' causes energization of vibrator coil 79. B+ is connected to ground through condenser 42, switch arm 20d in engagement with contact 5d, conductor 74, contact 5j engaged by switch arm 20j and grounded test lead 23.

The operation of vibrator means 75 causes the coil under test to be alternately connected to and alternately disconnected from B—. The interruption of current flow from the D.C. supply through the coil under test causes a high voltage pulse to appear at test lead 22. This pulse is stepped down through transformer 67 and is read upon meter 12. The meter circuit in position 5 of mode switch 20 is essentially the same metering circuit as previously described in connection with position 2 of mode switch 20. However, meter 12 is also paralleled by a series circuit comprising resistor 71, switch arm 20f engaged with contact 5f, resistor 57, and switch arm 20e engaged with contact 5e. In position 5 of mode switch 20 meter 12 indicates the magnitude of the voltage induced in the coil under test.

By operating mode switch 20 to its 6th position, or "CONT." position the continuity of the ignition system under test can be checked. In the 6th position of mode switch 20 test lead 21 is connected through switch arm 20k, engaged with contact 6k, and conductor 84 to B+. The negative terminal of meter 12 is connected through switch arm 20e in engagement with contact 6e, conductor 54, and resistor 53 to B+. The positive terminal of meter 12 is connected through conductor 68 and contact 6j engaged by switch arm 20j to the grounded test lead 23.

Resistor 53 is connected to B— through resistor 52, the engagement between switch arm 20c and contact 6c, and resistor 40. Thus, a small portion of the B+ voltage appearing across meter 12 is connected in series with the elements of the ignition system under test. A high reading on meter 12 indicates low resistance in the ignition system under test while no reading at all indicates a broken lead and/or high resistance, or a defective element. If the trouble in the ignition system is not positively identified by the foregoing tests, this indicates that there is damage to the magneto rotor magnets or stator magnets which necessitates a major overhaul.

Since a single meter 12 is utilized to indicate five different test functions each operation of mode switch 20 connects appropriate calibrating elements in the meter circuit. That is, arm 63 of resistor 64 calibrates meter 12 for position 2 of mode switch 20; arm 48' of resistor 48 calibrates meter 12 for position 3 of switch 20; arm 60 of resistor 59 calibrates meter 12 for position 4 of switch 20; arm 72' of resistor 71 calibrates meter 12 for position 5 of switch 20 after the calibration for position 2 has been set; and the calibration for position 6 is established through the relative resistances of resistors 52 and 53. The position of pointer 19 on scale 18 is compared with readings obtained by testing similar engines whose ignition systems are functioning properly.

Although I have here described preferred embodiment of my novel invention, many variations and modifications will now be apparent to those skilled in the art, and I therefore prefer to be limited, not by the specific disclosure herein, but only by the appending claims.

I claim:

1. An ignition system tester inclusive of single cylinder internal combustion engines comprising an indicator means, a first metering circuit means including a first and a second test lead adapted to be connected, respectively, to a high tension lead and to a grounded portion of an engine under test, and a multi-position switch means which, in a second position thereof, operatively connects said first metering circuit means in circuit with said indicator means; said first metering circuit means also including a capacitor and a diode connected in series combination and first means operatively connecting said combination to said first test lead whereby a single short duration high tension pulse produced by an engine ignition system in satisfactory operating condition and appearing at said first test lead will result in a visual indication appearing upon said indicator means for an interval of time sufficiently long to obtain a visual reading; said tester also comprising means for producing a regulated D.C. potential derived from an A.C. source, and control means including a thyratron connected to said D.C. potential; said first test lead connected to a control element of said thyratron; a second metering circuit means including an impedance element serially connected between said thyratron and said D.C. potential; said switch means being selectively operable to a third position whereby said indicator means is operatively connected in circuit with said second metering circuit means whereby an indication of current flow through said impedance element is obtained on said indicator means with this current flow being a function of engine speed; a third metering circuit means including said diode and an impedance element serially connected to said diode, and a third test lead adapted to be connected to an ungrounded terminal of an engine ignition system element; said switch means operable to a fourth position wherein said third metering circuit means is operatively connected in circuit with said indicator means; said tester further including a vibrator means operatively connected in circuit to alternately connect said third test lead to said D.C. potential and said third metering circuit means when said switch means is in said fourth position; a fourth metering circuit means including said first metering circuit means and an adjustable impedance connected in parallel with said indicator means; said switch means operable to a fifth position wherein said fourth metering circuit means is operatively connected in circuit with said indicator means; said vibrator means alternately connecting said third test lead to said D.C. potential and said fourth metering circuit means when said switch is in said fifth position.

2. An ignition system tester inclusive of single cylinder internal combustion engines comprising an indicator means, a first metering circuit means including a first and a second test lead adapted to be connected, respectively, to a high tension lead and to a grounded portion of an engine under test, and a multi-position switch means which, in a second position thereof, operatively connects said first metering circuit means in circuit with said indicator means; said first metering circuit means also including a capacitor and a diode connected in series combination and first means operatively connecting said combination to said first test lead whereby a single short duration high tension pulse produced by an engine ignition system in satisfactory operating condition and appearing at said first test lead will result in a visual indication appearing upon said indicator means for an interval of time sufficiently long to obtain a visual reading; said tester also comprising means for producing a regulated D.C. potential derived from an A.C. source, and control means including a thyratron connected to said D.C. potential; said first test lead connected to a control element of said thyratron; a second metering circuit means including an impedance element serially connected between said thyratron and said D.C. potential; said switch means being selectively operable to a third position whereby said indicator means is operatively connected in circuit with said second metering circuit means whereby an indication of current flow through said impedance element is obtained on said indicator means with this current flow being a function of engine speed; a third metering circuit means including said diode and an impedance element serially connected to said diode, and a third test lead adapted to be connected to an ungrounded terminal of an engine ignition system element; said switch means operable to a fourth position wherein said third metering circuit means is operatively connected in circuit with said indicator means; said tester further including a vibrator means operatively connected in circuit to alternately connect said third test lead to said D.C. potential and said third metering circuit means when said switch means is in said fourth position; a fourth metering circuit means including said first metering circuit means and an adjustable impedance connected in parallel with said indicator means; said switch means operable to a fifth position wherein said fourth metering circuit means is operatively connected in circuit with said indicator means; said vibrator means alternately connecting said third test lead to said D.C. potential and said fourth metering circuit means when said switch is in said fifth position; a fifth metering circuit means; said switch means operable to a sixth position wherein an element of said fifth metering circuit is connected in series with said third test lead whereby said indicator means indicates the magnitude of current flowing through said third test lead.

References Cited in the file of this patent

UNITED STATES PATENTS

| | | |
|---|---|---|
| 2,210,324 | Miller | Aug. 6, 1940 |
| 2,455,543 | Williams | Dec. 7, 1948 |
| 2,559,849 | Colvert | July 10, 1951 |
| 2,712,634 | Briner | July 5, 1955 |
| 3,028,543 | Paramater et al. | Apr. 3, 1962 |

OTHER REFERENCES

"Electrical Measurement Analysis," Ernest Frank, McGraw-Hill Book Company, Inc., New York, 1959, page 311, FIGURES 11–20.

"Applied Electrical Measurements," Isaac F. Kinnard, John Wiley and Sons, Inc., New York, 1956, page 125, FIGURES 4–48(b).